(12) United States Patent
Matsunaga et al.

(10) Patent No.: US 12,031,856 B2
(45) Date of Patent: Jul. 9, 2024

(54) LOOSENESS DETECTION SENSOR AND HOW TO IDENTIFY LOOSE BOLTS

(71) Applicant: Nippon Telegraph and Telephone Corporation, Tokyo (JP)

(72) Inventors: Eri Matsunaga, Musashino (JP); Tadashi Minotani, Musashino (JP); Masahito Nakamura, Musashino (JP); Masayuki Tsuda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 253 days.

(21) Appl. No.: 17/774,426

(22) PCT Filed: Nov. 15, 2019

(86) PCT No.: PCT/JP2019/044874
§ 371 (c)(1),
(2) Date: May 4, 2022

(87) PCT Pub. No.: WO2021/095234
PCT Pub. Date: May 20, 2021

(65) Prior Publication Data
US 2022/0397452 A1    Dec. 15, 2022

(51) Int. Cl.
*G01H 13/00*   (2006.01)
*G01N 22/00*   (2006.01)

(52) U.S. Cl.
CPC .................... *G01H 13/00* (2013.01)

(58) Field of Classification Search
CPC ........ G01N 19/08; G01N 29/12; G01N 27/00; G01N 22/00; G01H 17/00; G01H 13/00
See application file for complete search history.

(56) References Cited

U.S. PATENT DOCUMENTS

| | | | | |
|---|---|---|---|---|
| 2011/0138918 A1* | 6/2011 | Zagrai | ................... | G01N 29/34 73/588 |
| 2012/0274334 A1* | 11/2012 | Anderson | ............ | G05B 23/024 324/511 |
| 2014/0125319 A1* | 5/2014 | Shea | ........................ | G01R 1/20 324/126 |

FOREIGN PATENT DOCUMENTS

WO    WO-2014074205 A1 *    5/2014    ............. G01L 1/142

OTHER PUBLICATIONS

Tomotsugu Sakai et al., *Measurement of Bolt Axial Force Using Ultrasonic Waves*, Proceedings of the Japan Society of Mechanical Engineers, vol. 43, No. 366, 1977, pp. 723-729.

* cited by examiner

*Primary Examiner* — Herbert K Roberts
*Assistant Examiner* — Anthony W Megna Fuentes
(74) *Attorney, Agent, or Firm* — Workman Nydegger

(57) ABSTRACT

A sensor for detecting looseness of a plurality of bolts and nuts fixing parts includes: a non-conductive film attached to a surface of the part, which is one of the parts, including holes H from which the bolts are inserted; and a conductive film attached to the non-conductive film, configured to receive supply of a high-frequency signal, and having a same planar shape as that of the non-conductive film, wherein the planar shape is a shape in which a resonance frequency of the high-frequency signal confined in the non-conductive film is different according to a position of a loosened bolt, and the planar shape of the conductive film is a shape in which a distance between a bolt and an end portion of the conductive film is different for each of the plurality of bolts.

4 Claims, 12 Drawing Sheets

LOOSENESS DETECTION SENSOR AND HOW TO IDENTIFY LOOSE BOLTS

TECHNICAL FIELD

The present invention relates to a looseness detection sensor for detecting looseness of bolts fixing two or more parts to each other, and a method for specifying a loosened bolt.

BACKGROUND ART

Bolts tighten and fix parts to each other, and are used in various applications ranging from large-scale facilities such as infrastructure structures and plant facilities to familiar products such as vehicles, play equipment, and furniture. Bolts may be loosened or detached from joints due to vibration, plastic deformation caused by an excessive force, or a deterioration such as fatigue.

These phenomena cause, for example, collapse of bridges, leakage of gas and liquid from the joints, damage to play equipment, and accidents resulting in injury or death caused by objects falling from a great height, and the like. In order to prevent these accidents, there are inspection methods such as a method in which marking is provided on a bolt and a displacement of matching marks is checked, a hammering test, and an inspection method using ultrasonic waves (NPL 1).

CITATION LIST

Non Patent Literature

NPL 1: Tomotsugu SAKAI, and two others, "Measurement of Axial Force using Ultrasonic Waves", Transactions of the Japan Society of Mechanical Engineers, Vol. 43, No. 366 (1977).

SUMMARY OF THE INVENTION

Technical Problem

However, the method in which a displacement of matching marks is checked and the hammering test are not suitable to inspect a portion that is difficult to visually inspect due to the inspection target being located in a place where the target is hard to see or being in far distance. Furthermore, skills are required, and thus these inspections have a problem of being difficult for an unskilled person.

Furthermore, the inspection method using ultrasonic waves incurs a high cost because measurement devices have to be carried to and used in inspection at a place such as a high place where operations are difficult. Furthermore, this method also has a problem of being dangerous. In this manner, there is no object or method suitable to inspect looseness of bolts tightening two parts.

The present invention was made in view of the above-described problems, and it is an object thereof to provide a looseness detection sensor suitable to inspect looseness of a plurality of bolts tightening two or more parts, and a method for specifying a loosened bolt.

Means for Solving the Problem

An aspect of the present invention is directed to a looseness detection sensor for detecting looseness of a plurality of bolts and nuts fixing two or more parts to each other, including: a non-conductive film attached to a surface of one of the parts including holes from which the bolts are inserted; and a conductive film attached to the non-conductive film, configured to receive supply of a high-frequency signal, and having a same planar shape as that of the non-conductive film, wherein the planar shape is a shape in which a resonance frequency of the high-frequency signal confined in the non-conductive film is different according to a position of a loosened bolt.

Furthermore, an aspect of the present invention is directed to a method for specifying a loosened bolt, performed by a looseness detection apparatus for detecting looseness of a plurality of bolts and nuts fixing two or more parts to each other, including: a high-frequency sweep step of sweeping a high-frequency signal at a frequency in a predetermined range and supplying the signal to a conductive film attached to a non-conductive film attached to a surface of one of the parts including holes from which the bolts are inserted; a resonance frequency detecting step of detecting a resonance frequency of the part to which the conductive film is attached; a resonance frequency recording step of recording a resonance frequency detected in the resonance frequency detecting step; a determining step of comparing the resonance frequency detected in the resonance frequency detecting step and a previous resonance frequency, and determining whether or not the bolts are loosened based on whether or not there is a new resonance frequency or an amount of change in a resonance frequency; and a specifying step of, in a case in which it is determined in the determining step that there is a loosened bolt, specifying the loosened bolt based on whether or not there is a new resonance frequency or an amount of change in a resonance frequency.

Effects of the Invention

According to the present invention, it is possible to provide a looseness detection sensor suitable to inspect looseness of a plurality of bolts tightening two or more parts, and a method for specifying a loosened bolt.

BRIEF DESCRIPTION OF DRAWINGS

FIG. 4 shows views schematically showing the bolts shown in FIG. 1, a plane of a conductive film, and an electric field distribution, where

DESCRIPTION OF EMBODIMENTS

Figure 1:
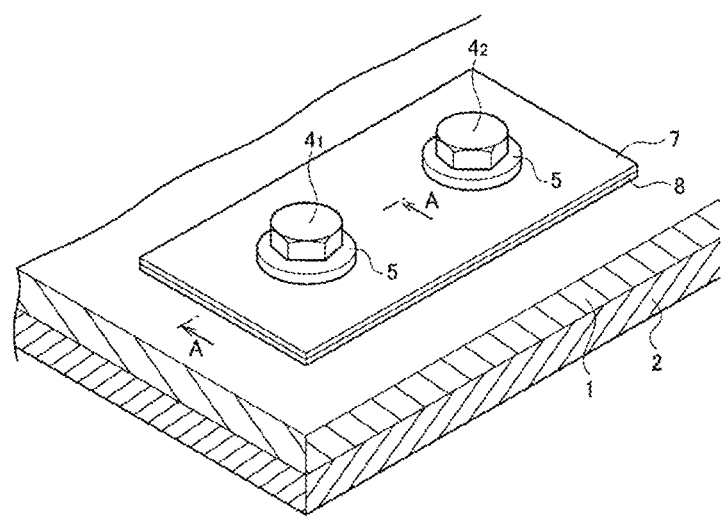
FIG. 1 is a perspective view showing an example of a looseness detection sensor according to an embodiment of the present invention.

Hereinafter, an embodiment of the present invention will be described with reference to the drawings. The same constituent elements in a plurality of drawings are denoted by the same reference numerals, and a description thereof will not be repeated.

Looseness Detection Sensor

FIG. 1 is a perspective view showing an example of a looseness detection sensor according to an embodiment of the present invention. A looseness detection sensor 100 shown in FIG. 1 is used to detect looseness of two bolts $4_1$ and $4_2$ and nuts 5 fixing two or more parts 1 and 2 to each other. The following description will be given based on an example in which two parts are fixed to each other by the two bolts $4_1$ and $4_2$, but the number of parts that are fixed may be a plural number such as 2 or more.

The subscript of the bolt $4_1$ is the number for specifying the position of the bolt. If there is no need to specify the position, the subscript is omitted.

The example shown in FIG. 1 is an example in which the parts 1 and 2 are steel materials. The structure for fixing the two parts 1 and 2 to each other is not limited to this example. It is also possible to use a plurality of different types of bolts. Furthermore, the two steel materials may be fixed to each other via a splice plate (not shown). Furthermore, the number of bolts is not limited to two. Furthermore, washers 5 do not have to be used. The following description will be given assuming that the washers 5 are omitted.

Figure 2:
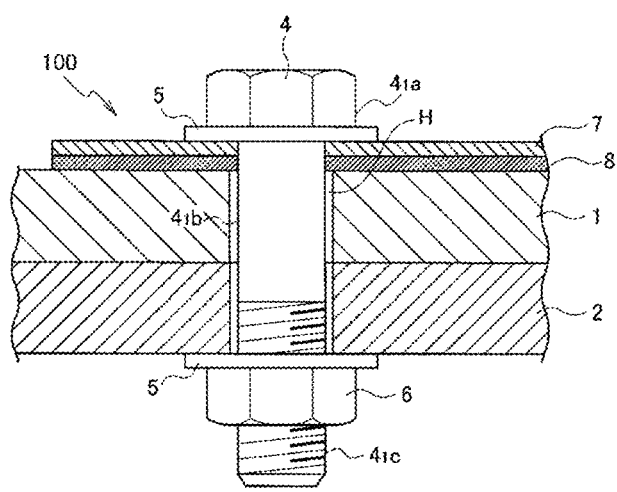
FIG. 2 is a cross-sectional view of the structure taken along the line A-A shown in FIG. 1.

FIG. 2 is a cross-sectional view of the structure taken along the line A-A shown in FIG. 1. The cross-section shown in FIG. 2 includes a conductive film 7, a non-conductive film 8, a part (steel material) 1, a part (steel material) 2, and a nut 6, in this order from above. The bolt 4 is inserted into a hole H formed through the parts 1 and 2, and the nut 6 is fitted to a threaded portion 4c of the bolt 4 projecting to the opposite side, so that the parts are fixed to each other.

The conductive film 7 can be formed by applying conductive paint. The conductive paint may be, for example, paint containing conductive fillers made of metal particles (e.g., silver or copper), carbon, or the like. The non-conductive film 8 can also be formed by applying paint. The paint may be, for example, paint made of modified epoxy resin or the like. Furthermore, the conductive film 7 can be formed by attaching a conductive sheet. The conductive sheet may be, for example, a film containing conductive fillers made of metal particles or carbon as in the case of a conductive paint, a metal sheet made of aluminum, or the like.

As shown in FIG. 2, a head $4_1a$ of the bolt $4_1$ is not in direct contact with the part 1. Furthermore, the diameter of the bolt $4_1$ is smaller than that of the hole H, and thus, typically, the bolt $4_1$ is not in electrical conduction with the parts 1 and 2. Note that, when the bolt $4_1$ is inserted into the hole H in an eccentric manner, the bolt $4_1$ may come into contact with the hole H. If such a case will happen, a stem $4_1b$ of the bolt $4_1$ may be coated.

That is to say, the bolt $4_1$ is prevented from being in direct conduction with the parts 1 and 2. As a result, the bolt $4_1$ is in electrical conduction with the parts 1 and 2 via the nut 6. If the parts 1 and 2 have a conductive surface, electrical conduction is established through a path connecting the conductive film 7, the bolt $4_1$, the nut 6, the part 2, and the part 1. The same applies to the bolt $4_2$ side.

Furthermore, if the parts 1 and 2 have an insulating or low-conductive surface, a conductive film (second conductive film) 9 (not shown) is provided between the non-conductive film 8 and the part 1. The planar shape and the thickness of the second conductive film 9 are, for example, the same as those of the conductive film 7. That is to say, the looseness detection sensor 100 in the case in which the parts 1 and 2 have an insulating surface has a three-layer structure in which the non-conductive film 8 is held between the conductive film 7 and the second conductive film 9. The following description will be given based on an example in which the parts 1 and 2 have a conductive surface.

Figure 3:
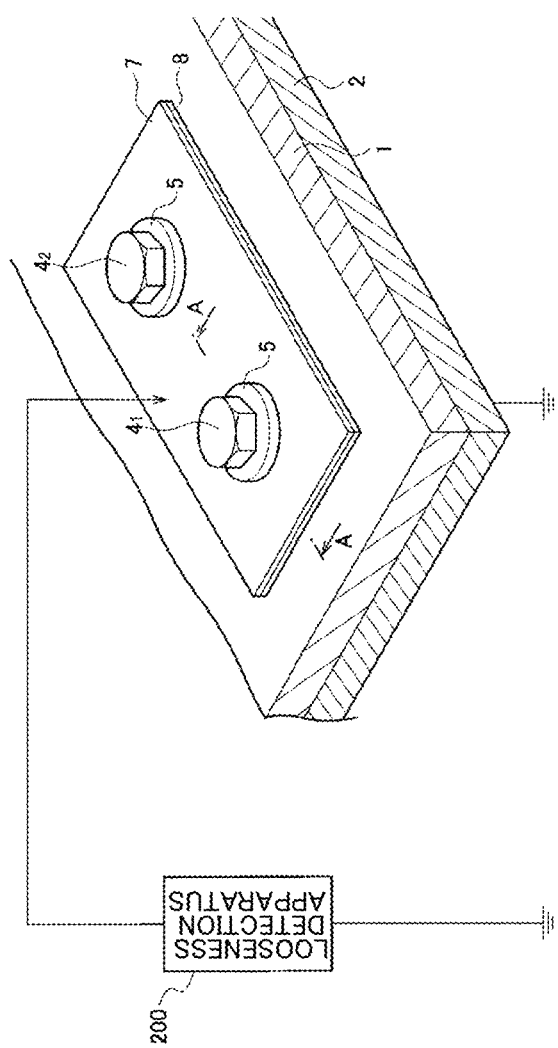
FIG. 3 is a schematic view showing the looseness detection sensor shown in FIG. 1 and a looseness detection apparatus.

FIG. 3 is a view schematically showing a looseness detection apparatus 200 for detecting looseness of the bolts 4 by supplying a high-frequency signal to the looseness detection sensor 100 according to this embodiment. The looseness detection apparatus 200 supplies a high-frequency signal to the looseness detection sensor 100 and the parts 1 and 2, and detects a change in the resonance frequency of the high-frequency signal transmitted through the above-mentioned path. The resonance frequency is detected by scanning the frequency of the high-frequency signal that is supplied. The high-frequency signal is confined in the non-conductive film 8.

The frequency (resonance frequency) of the high-frequency signal confined in the non-conductive film 8 changes in accordance with the loosened states of the bolts 4.

FIG. 4 shows views of the bolts $4_1$ and $4_2$ and a plane of the conductive film 7. α represents a supply point of the high-frequency signal.

The distance between the center of the bolt $4_1$ and the end portion on the bolt $4_1$ side in the bolt arrangement direction of the conductive film 7 is $L_1$. Furthermore, the distance between the center of the bolt $4_2$ and the end portion on the bolt $4_2$ side in the bolt arrangement direction of the conductive film 7 is $L_2$. Furthermore, the distance between the centers of the bolts $4_1$ and $4_2$ is $L_3$. In this example, the distance $L_2$ is larger than the distance $L_1$ ($L_1 < L_2$). Note that the part 1 is not shown.

Figure 4A:
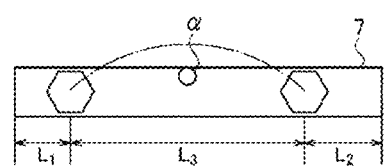
FIG. 4(a) shows a case in which both bolts are tightened.
Figure 4B:
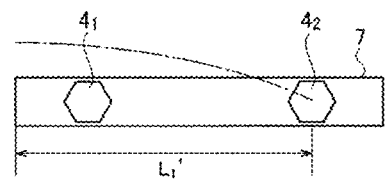
FIG. 4(b) shows a case in which one of the bolts is loosened.
Figure 4C:
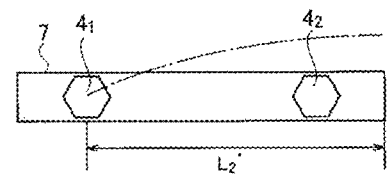
FIG. 4(c) shows a case in which the other bolt is loosened.

FIG. 4 schematically shows a state in which the resonance frequency changes in accordance with the respective loosened states of the bolts $4_1$ and $4_2$. FIG. 4(a) shows a case in which none of the bolts $4_1$ and $4_2$ are loosened, FIG. 4(b) shows a state in which the bolt $4_1$ is loosened, and FIG. 4(c) shows a state in which the bolt $4_2$ is loosened.

In the case in which none of the bolts $4_1$ and $4_2$ are loosened as shown in FIG. 4(a), a frequency (resonance frequency) corresponding to a wavelength at which the distance $L_3$ between the bolt $4_1$ and the bolt $4_2$ matches a wavelength $\lambda/2$ of the high-frequency signal ($L_3 = \lambda/2$) is confined in the non-conductive film 8. The arc (dash-dotted line) in FIG. 4(a) schematically indicates the resonance frequency as an electric field distribution of the non-conductive film 8.

In the case in which the bolt $4_1$ is loosened as shown in FIG. 4(b), the amplitude of vibration caused by the resonance at the position of the bolt $4_1$, which has been suppressed by the bolt $4_1$, increases. Then, as indicated by the dash-dotted line in FIG. 4(b), the electric field near the bolt $4_1$ increases. As a result, the resonance frequency ($L_3=\lambda/2$) changes to a resonance frequency corresponding to a wavelength at which a distance $L_1'$ between the center of the bolt $4_2$ and the end portion on the bolt $4_1$ side of the conductive film 7 matches a wavelength $\lambda/4$ of the high-frequency signal ($L_1'=\lambda/4$).

In the case in which the bolt $4_2$ is loosened as shown in FIG. 4(c), the amplitude of vibration caused by the resonance at the position of the bolt $4_2$, which has been suppressed by the bolt $4_2$, increases. Then, as indicated by the dash-dotted line in FIG. 4(c), the electric field near the bolt $4_2$ increases. As a result, the resonance frequency ($L_3=\lambda/2$) changes to a resonance frequency corresponding to a wavelength at which a distance $L_2'$ between the center of the bolt $4_1$ and the end portion on bolt $4_2$ side of the conductive film 7 matches a wavelength $\lambda/4$ of the high-frequency signal ($L_2'=\lambda/4$).

Since the distance $L_2$ is larger than the distance $L_1$ ($L_1<L_2$), the resonance frequency when the bolt $4_1$ is loosened and the resonance frequency when the bolt $4_2$ is loosened are different from each other. In this case, the resonance frequency when the bolt $4_2$ is loosened is lower than the resonance frequency when the bolt $4_1$ is loosened.

In this manner, the planar shape of the conductive film 7 is a shape in which the distance between a bolt and an end portion of the conductive film is different for each of the plurality of bolts. Accordingly, a loosened bolt can be specified. Note that, as shown in FIG. 1, the conductive film 7 and the non-conductive film 8 have the same planar shape.

Looseness Detection Apparatus

Figure 5:
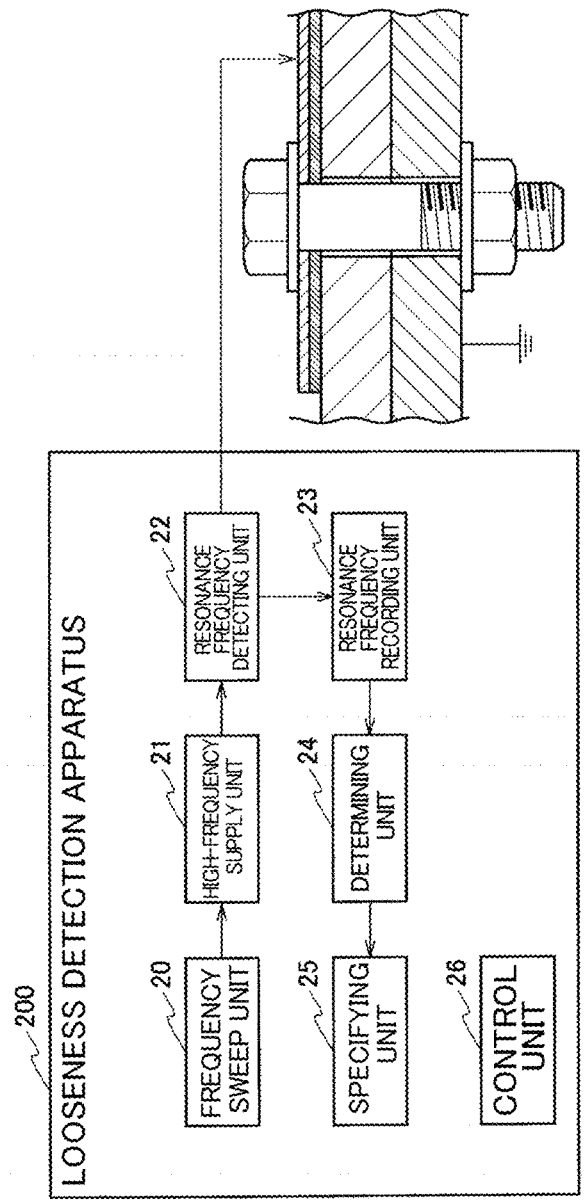
FIG. 5 is a block diagram showing an example of the functional configuration of the looseness detection apparatus shown in FIG. 3.

FIG. 5 is a block diagram showing an example of the functional configuration of a looseness detection apparatus according to an embodiment of the present invention. The looseness detection apparatus 200 shown in FIG. 5 is an apparatus for detecting looseness of the bolts 4 by supplying a high-frequency signal to the looseness detection sensor 100.

The looseness detection apparatus 200 includes a frequency sweep unit 20, a high-frequency supply unit 21, a resonance frequency detecting unit 22, a resonance frequency recording unit 23, a determining unit 24, a specifying unit 25, and a control unit 26. The control unit 26 is a functional configuration unit that controls operations of the functional configuration units, and can be constituted by, for example, a computer including a ROM, a RAM, a CPU, and the like. If the control unit 26 is realized by a computer, part of the resonance frequency detecting unit 22, the resonance frequency recording unit 23, the determining unit 24, and the specifying unit 25 can also be constituted by the computer.

The frequency sweep unit 20 sweeps a frequency in a predetermined range. The frequency in a predetermined range is different for each of the above-described distances $L_1$ and $L_2$, and, for example, within the range of 0.8 to 1.6 GHz. The frequency sweep unit 20 sweeps the frequency between a start frequency (0.8 GHz) and a stop frequency (1.6 GHz) each time the processing for detecting looseness of bolts is performed.

The high-frequency supply unit 21 generates a high-frequency signal at the frequency swept by the frequency sweep unit 20, and supplies the signal to the conductive film 7 of the looseness detection sensor 100. In this example, the high-frequency signal is supplied to a point between the bolts $4_1$ and $4_2$.

The resonance frequency detecting unit 22 detects a resonance frequency of the parts 1 and 2 to which the conductive film 7 is attached. The resonance frequency can be obtained through Fast Fourier Transform (FFT) of a high-frequency current flowing in the conductive film 7.

Alternatively, it is also possible to detect the resonance frequency through Fast Fourier Transform of reflected waves reflected by the conductive film 7. In the case of detection using reflected waves, the resonance frequency detecting unit 22 is connected in series between the conductive film 7 and the resonance frequency recording unit 23 (not shown). Specific examples of the resonance frequency will be described later.

The resonance frequency recording unit 23 records the resonance frequency detected by the resonance frequency detecting unit 22. The resonance frequency can be obtained, for example, from a peak value of a frequency spectrum of reflected waves between the start frequency (0.8 GHz) and the stop frequency (1.6 GHz). Alternatively, it is also possible to obtain the resonance frequency from a peak value of a frequency spectrum of a high-frequency current flowing in the conductive film 7.

The determining unit 24 first compares an obtained peak value and a previously obtained peak value, thereby determining whether or not the bolt $4_1$ or $4_2$ is loosened based on whether or not there is a new resonance frequency or the amount of change in a resonance frequency.

If the determining unit 24 determines that there is a loosened bolt, the specifying unit 25 specifies the loosened bolt based on whether or not there is a resonance frequency or the amount of change in a resonance frequency. Specific examples of specifying a bolt will be described later.

Method for Specifying Loosened Bolt

Figure 6:
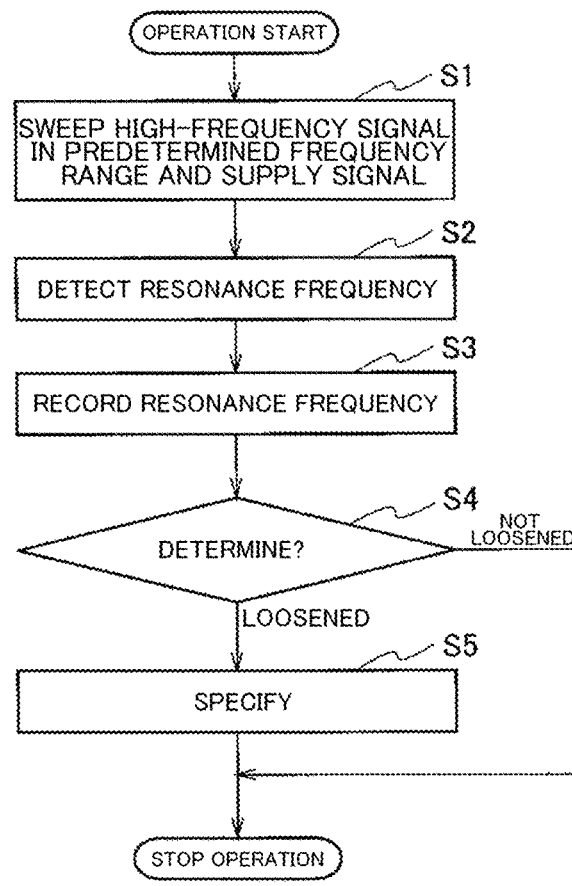
FIG. 6 is a flowchart showing the processing procedure of the looseness detection apparatus shown in FIG. 3.

FIG. 6 is a flowchart showing the processing procedure of a method for specifying a loosened bolt, performed by the looseness detection apparatus 200.

The method for specifying a loosened bolt according to this embodiment includes a high-frequency sweep step S1, a resonance frequency detecting step S2, a resonance frequency recording step S3, a determining step S4, and a specifying step S7.

In the high-frequency sweep step S1, a high-frequency signal at a frequency in a predetermined range is swept and supplied to the conductive film 7, the conductive film being attached to the non-conductive film 8 attached to the surface of the part 1, which is one of the parts, including the holes H from which the bolts 4 are inserted.

In the resonance frequency detecting step S2, a resonance frequency of the parts 1 and 2 to which the conductive film 7 is attached is detected.

In the resonance frequency recording step S3, the resonance frequency detected in the resonance frequency detecting step S2 is recorded.

In the determining step S4, the resonance frequency detected in the resonance frequency detecting step S2 and a previous resonance frequency (a resonance frequency already recorded in the resonance frequency recording step S3) are compared, and whether or not the bolts 4 are loosened is determined based on whether or not there is a new resonance frequency or the amount of change in a resonance frequency.

If it determined in the determining step S4 that there is a loosened bolt 4, in the specifying step S7, the loosened bolt $4_1$ or $4_2$ is specified based on whether or not there is a new resonance frequency or the amount of change in a resonance frequency.

It is possible to detect looseness of the bolts 4 and to specify the loosened bolt $4_1$ or $4_2$, by performing the above-described processing steps.

Specific Example 1

Figure 7:
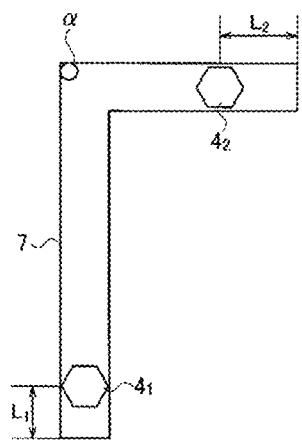
FIG. 7 is a plan view showing a specific example of the looseness detection sensor.

FIG. 7 is a view showing a specific example of the looseness detection sensor. Specific Example 1 shown in FIG. 7 is an example in which the planar shape of the conductive film 7 is a hooked shape.

In this manner, the shape of the conductive film 7 is not limited to a rectangular shape depending on the installation conditions of the structures. Furthermore, the positions of the bolts 4 may also be arranged in various patterns. FIG. 7 shows an example in which the two end portions of a hook-shaped film, which are not bent at a right angle, are fixed by the bolts 4.

In Specific Example 1, the conductive film 7 has a total length of 18 cm and a width of 1 cm. M5 bolts were used as the bolts $4_1$ and $4_2$. The distance $L_1$ between the center of the bolt $4_1$ and the end portion on the bolt $4_1$ side of the conductive film 7 is, for example, $L_1$=1 cm. Furthermore, the distance $L_2$ between the center of the bolt $4_2$ and the end portion on the bolt $4_2$ side of the conductive film 7 is, for example, $L_2$=2 cm.

A high-frequency signal is supplied to the supply point α in the corner portion bent at a right angle, and a high-frequency signal (resonance frequency) confined in the non-conductive film 8 having the same shape as that of the conductive film 7 was measured using the above-described looseness detection apparatus 200.

Figure 8:
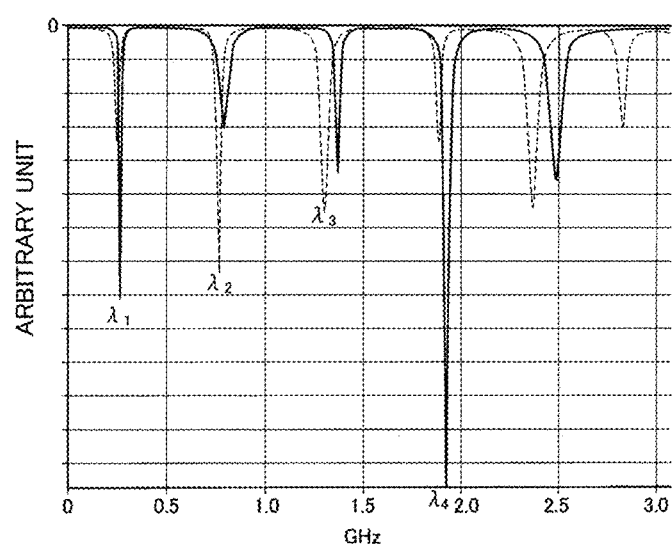
FIG. 8 is a graph showing results of measurement of a high-frequency signal (resonance frequency) confined in a non-conductive film of the looseness detection sensor shown in FIG. 7, obtained using the looseness detection apparatus.

FIG. 8 is a graph showing resonance frequencies as measured while each of the bolts $4_1$ and $4_2$ in Specific Example 1 is loosened. In FIG. 8, the horizontal axis indicates the frequency (GHz), and the vertical axis indicates the arbitrary unit.

As shown in FIG. 8, when one of the bolts is loosened, four or more resonance frequencies are detected. In this example, the third resonance frequency from the lower frequency side indicates a difference in the position of a loosened bolt.

In this manner, the planar shape of the conductive film 7 is a shape in which the distance between a bolt 4 and an end portion of the conductive film 7 is different for each of the plurality of bolts $4_1$ and $4_2$, and thus the loosened bolt 4 can be specified.

Conversely, if the distance $L_1$=the distance $L_2$, a loosened bolt cannot be specified. Furthermore, if the difference between the distance $L_1$ and the distance $L_2$ is too large, fundamental waves of the resonance frequency of one of the bolts and higher harmonics of the other bolt are likely to overlap each other, which is not preferable.

Accordingly, the difference between the distance $L_1$ and the distance $L_2$ is set to be within a predetermined range. For example, the difference is preferably set to be within the range represented by the following formula.

$$10\% \geq \frac{L_2 - L_1}{\lambda} \geq 5\% \quad (1)$$

$L_1$ and $L_2$ that fall within the above-mentioned range were calculated assuming that the frequency is 1.6 GHz. Table 1 shows calculation results of $L_1$ and $L_2$ that realize the percentage indicated by the formula (1) assuming that the materials of the parts 1 and 2 have a dielectric constant of 3.5.

TABLE 1

| Frequency | $L_1$ (cm) | $L_2$ (cm) | $L_1 - L_2$ | Wavelength (cm) | $(L_1 - L_2)/\lambda$ |
|---|---|---|---|---|---|
| 1.6 GHz | 3 | 2 | 1 | 10.02 | 10.0% |
| 1.6 GHz | 3 | 2.4 | 0.6 | 10.02 | 6.0% |

As shown in Table 1, in the above-mentioned conditions such as dielectric constant, it is easy to detect looseness of bolts if the difference between the distances ($L_1$-$L_2$) is approximately 1 cm.

Specific Example 2

FIG. 9 shows views showing another specific example of the looseness detection sensor. Specific Example 2 shown in FIG. 9 is an example in which portions near the four corners of a rectangular conductive film 7 are respectively fixed by the bolts 4.

Figure 9A:
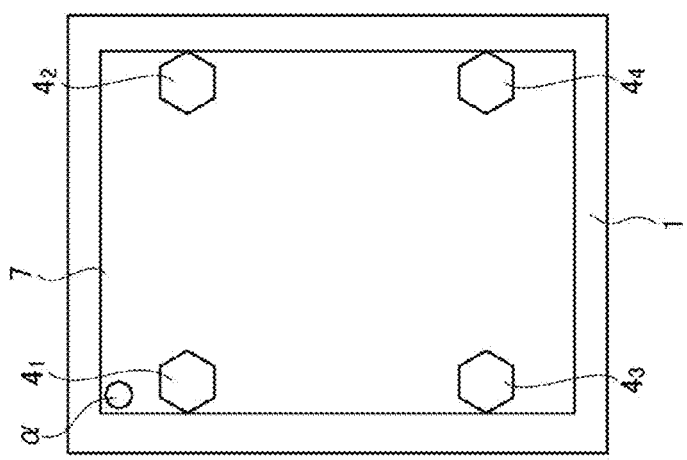
FIG. 9(a) shows a plan view showing another specific example of the looseness detection sensor.

As shown in FIG. 9(a), if the supply point α is positioned at the upper left corner portion of the rectangular conductive film 7, the distances between the supply point α and the respective bolts 4 can be made different from each other. In this manner, the conductive film 7 (looseness detection sensor) may have a planar shape with which the distances between the supply point α and the respective bolts 4 are not uniform.

Figure 9B:
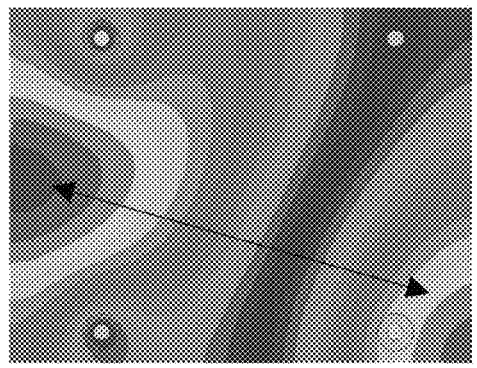
FIGS. 9(b)-9(c) show the magnitude of vibration amplitude as contour lines.

FIG. 9(b) is a diagram showing, as contour lines, the magnitude of vibration when a bolt $4_3$ at the lower left corner is loosened. The vibration amplitudes at the corner portion on the bolt $4_3$ side of the conductive film 7 and the middle portion between the bolts $4_1$ and $4_2$ on the upper side of the conductive film 7 are large. The vibration amplitude near the bolt $4_4$ is small.

When the bolt $4_3$ is loosened, the vibration amplitudes at the middle portion between the supply point α and the upper right corner of the conductive film 7 and the portion of the bolt $4_3$ increase, and these portions define the antinodes of vibration. In this case, the resonance frequency corresponds to λ/2 if the distance between the two antinodes are taken as a wavelength λ.

Figure 9C:
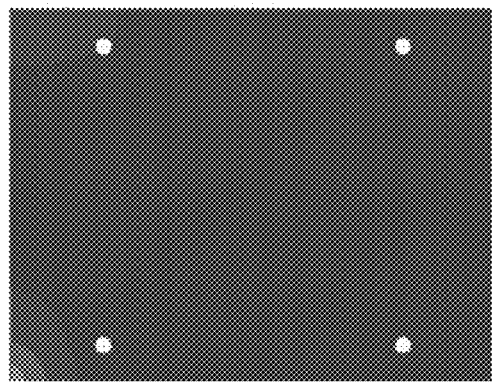

FIG. 9(c) is a diagram showing, as contour lines, the magnitude of vibration when the bolt $4_2$ at the upper right corner is loosened. In this case, there is no portion in which the vibration amplitude increases.

In this manner, also in the case in which the number of bolts 4 is four, the position of a loosened bolt 4 can be specified based on a change in the resonance frequency. Note that, although Specific Example 2 is an example in which the planar shape of the conductive film 7 is a rectangular shape with four equal angles, the planar shape also may be a trapezoidal shape.

In this manner, the planar shape of the conductive film 7 is a shape in which the distance between the supply point α to which a high-frequency signal is supplied and a bolt is different for each of the plurality of bolts, and thus the loosened bolt 4 can be specified.

Figure 10:
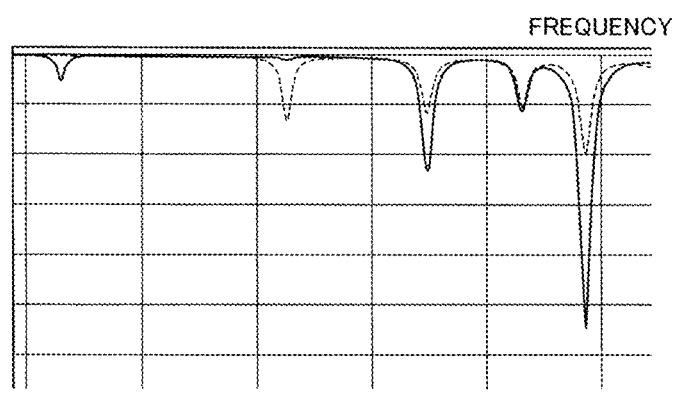
FIG. 10 is a graph showing changes in resonance frequencies of the looseness detection sensor shown in FIG. 9.

FIG. 10 shows changes in the resonance frequencies in Specific Example 2 above, as changes in frequency spectra. In FIG. 10, the horizontal axis indicates the frequency, and the vertical axis indicates the arbitrary unit. The solid line indicates the case in which the bolt $4_2$ is loosened, and the broken line indicates the case in which the bolt $4_3$ is loosened.

As shown in FIG. 10, when the bolt $4_3$ is loosened, the amount of change in the second frequency spectrum from the lower frequency side is largest. In this manner, a loosened bolt can be specified based on whether or not a new frequency spectrum has been generated.

Specific Example 3

Figure 11:
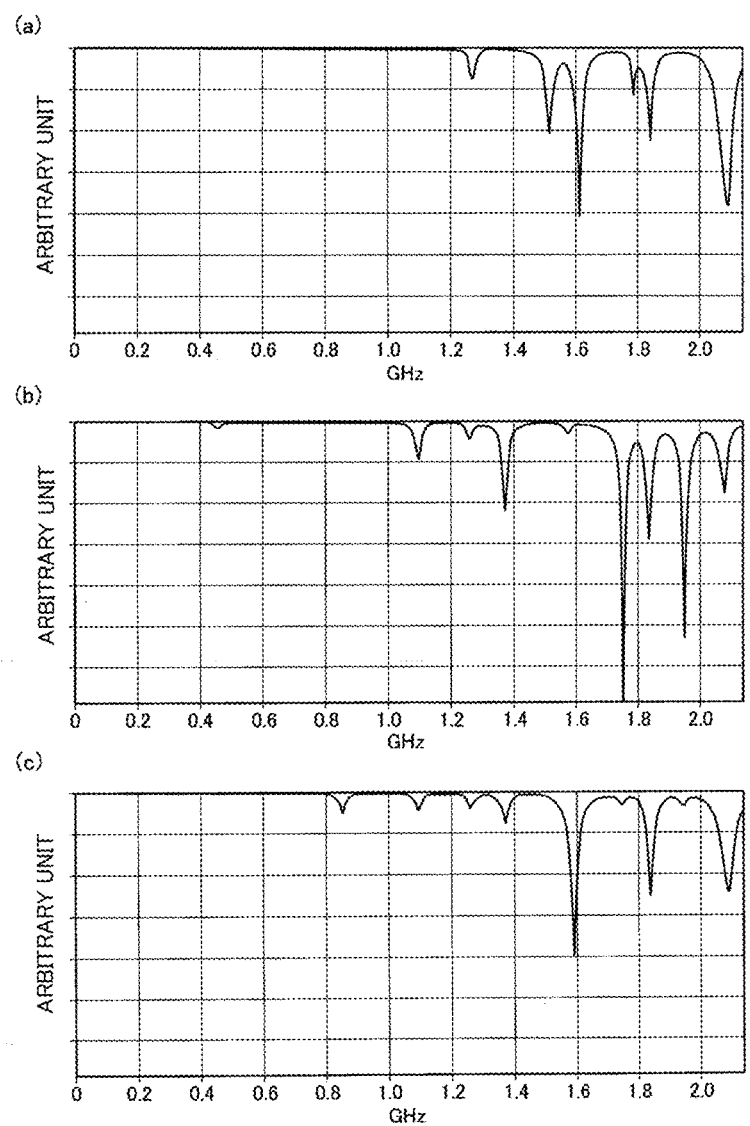
FIG. 11 shows graphs showing states in which the resonance frequency changes in accordance with the position of a loosened bolt in another specific example of the looseness detection sensor.

FIG. 11 shows graphs showing a change in a frequency spectrum as measured while each of the four bolts is loosened in Specific Example 3 in which the size of the rectangular conductive film 7 shown in FIG. 9 is changed. The conductive film 7 and the non-conductive film 8 in Specific Example 3 (not shown) had a rectangular shape with a length of each longer side of 13 cm and a length of each shorter side of 10 cm.

FIG. 11(a) shows a frequency spectrum obtained when all four bolts are tightened. FIG. 11(b) shows a frequency spectrum obtained when the bolt $4_2$ (FIG. 9(a)) is loosened. FIG. 11(c) shows a frequency spectrum obtained when the bolt $4_3$ is loosened.

In FIG. 11, the horizontal axis indicates the frequency (GHz), and the vertical axis indicates the arbitrary unit. The same applies to FIG. 12.

Figure 12A:
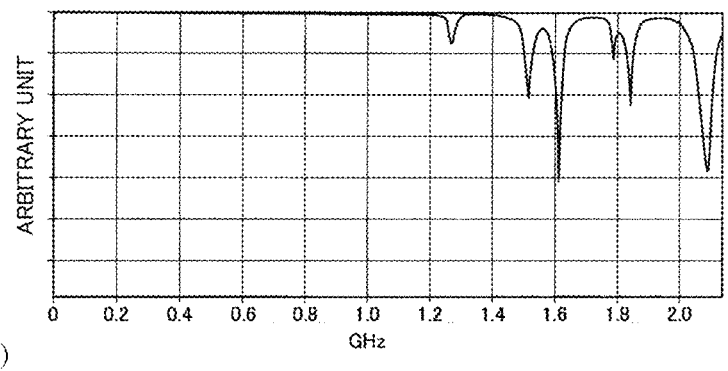
FIG. 12 shows graphs showing states in which the resonance frequency changes in accordance with the position of a loosened bolt in another specific example of the looseness detection sensor.
Figure 12B:
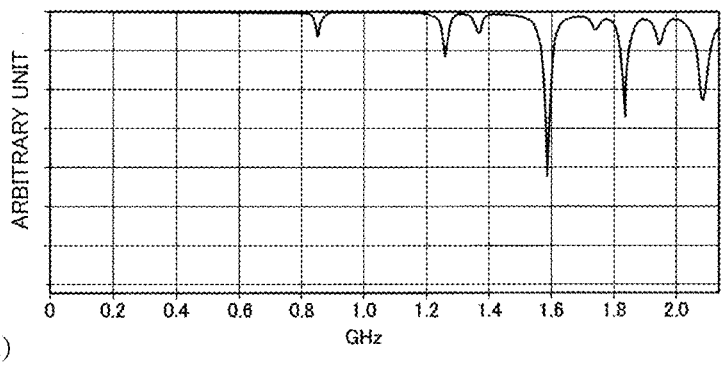
Figure 12C:
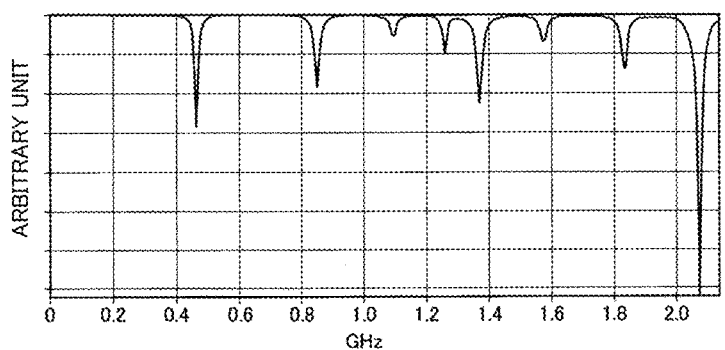

FIG. 12 shows graphs showing changes in frequency spectra as measured while the other bolts are loosened. FIG. 12(a) shows the same case as that in FIG. 11(a). FIG. 12(b) shows a frequency spectrum obtained when the bolt $4_4$ is loosened. FIG. 12(c) shows a frequency spectrum obtained when the bolt $4_4$ is loosened.

As shown in FIGS. 11 and 12, an obtained frequency spectrum is different according to the position of a loosened bolt 4. Thus, which of the bolts $4_1$ to $4_4$ is loosened can be specified based on a difference between the frequency spectra.

As described above, with the looseness detection sensor 100 according to this embodiment and the method for specifying a loosened bolt using the same, looseness of bolts 4 fixing two parts to each other is detected based on a change in the resonance vibration on a detection target face of the parts. Thus, they are preferably used to inspect a portion that is difficult to visually inspect due to the inspection target being located in a place where the target is hard to see or being in far distance.

Furthermore, it is also possible to quantitively obtain inspection results. Furthermore, it is also possible to remotely detect looseness of the bolts 4, by arranging the looseness detection sensor 100 and the looseness detection apparatus 200 away from each other. The looseness detection sensor 100 and the looseness detection apparatus 200 may be connected to each other via a high-frequency signal line such as a microstrip line. Furthermore, the looseness detection sensor 100 and the looseness detection apparatus 200 may also be connected to each other via a waveguide or the like.

Furthermore, it is also possible that the looseness detection apparatus 200 is arranged near a bolt 4 that is most important in the structure and is configured to wirelessly transmit the detection results. Accordingly, it is possible to eliminate risks caused by the inspection. Furthermore, it is also possible to reduce the inspection cost.

Note that the looseness detection sensor 100 in the present invention is not limited to those in Specific Examples 1 to 3. The senor may be widely applied to structures for fixing two or more parts to each other using a plurality of bolts 4. Furthermore, although the examples were described in which the planar shape of the conductive film 7 has a rectangular or hooked shape, there is no limitation to this example.

In this manner, the present invention is not limited to the foregoing embodiment, and can be modified within the gist of the invention.

REFERENCE SIGNS LIST 1, 2 Part
4 Bolt
5 Washer
6 Nut
7 Conductive film
8 Non-conductive film
9 Second conductive film
100 Looseness detection sensor
20 Frequency sweep unit
21 High-frequency supply unit
22 Resonance frequency detecting unit
23 Resonance frequency recording unit
24 Determining unit
25 Specifying unit
26 Control unit
200 Looseness detection apparatus

The invention claimed is:

1. A looseness detection sensor for detecting looseness of a plurality of bolts and nuts fixing two or more parts to each other, comprising:
   a non-conductive film attached to a surface of one of the parts including holes from which the bolts are inserted; and
   a conductive film attached to the non-conductive film, configured to receive supply of a high-frequency signal, and having a same planar shape as that of the non-conductive film,
   wherein the planar shape is a shape in which a resonance frequency of the high-frequency signal confined in the non-conductive film is different according to a position of a loosened bolt.

2. The looseness detection sensor according to claim 1, wherein the planar shape is a shape in which a distance between a bolt and an end portion of the conductive film is different for each of the plurality of bolts.

3. The looseness detection sensor according to claim 1, wherein the planar shape is a shape in which a distance between a bolt and a supply point to which the high-frequency signal is supplied is different for each of the plurality of bolts.

4. A method for specifying a loosened bolt, performed by a looseness detection apparatus for detecting looseness of a plurality of bolts and nuts fixing two or more parts to each other, comprising:
   a high-frequency sweep step of sweeping a high-frequency signal at a frequency in a predetermined range and supplying the signal to a conductive film attached to a non-conductive film attached to a surface of one of the parts including holes from which the bolts are inserted;
   a resonance frequency detecting step of detecting a resonance frequency of the part to which the conductive film is attached;
   a resonance frequency recording step of recording a resonance frequency detected in the resonance frequency detecting step;

a determining step of comparing the resonance frequency detected in the resonance frequency detecting step and a previous resonance frequency, and determining whether or not the bolts are loosened based on whether or not there is a new resonance frequency or an amount of change in a resonance frequency; and a specifying step of, in a case in which it is determined in the determining step that there is a loosened bolt, specifying the loosened bolt based on whether or not there is a new resonance frequency or an amount of change in a resonance frequency.

\* \* \* \* \*